No. 689,793. Patented Dec. 24, 1901.
J. C. CAROTHERS & N. E. MORRIS, Jr.
STRAW STACKER AND CHAFF SEPARATOR.
(Application filed June 5, 1901.)
(No Model.)
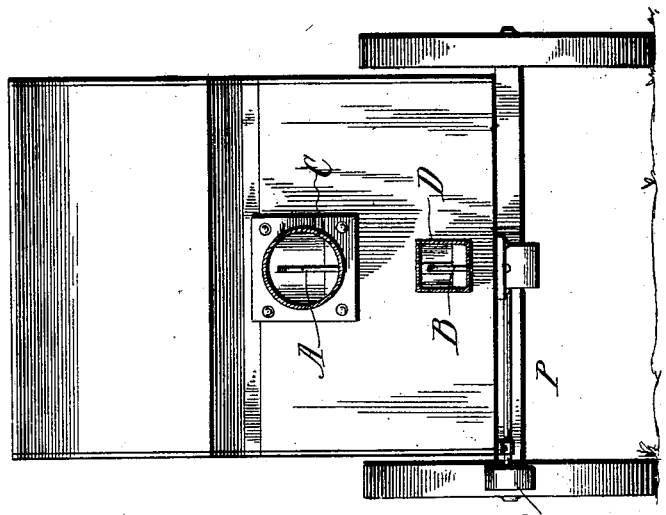
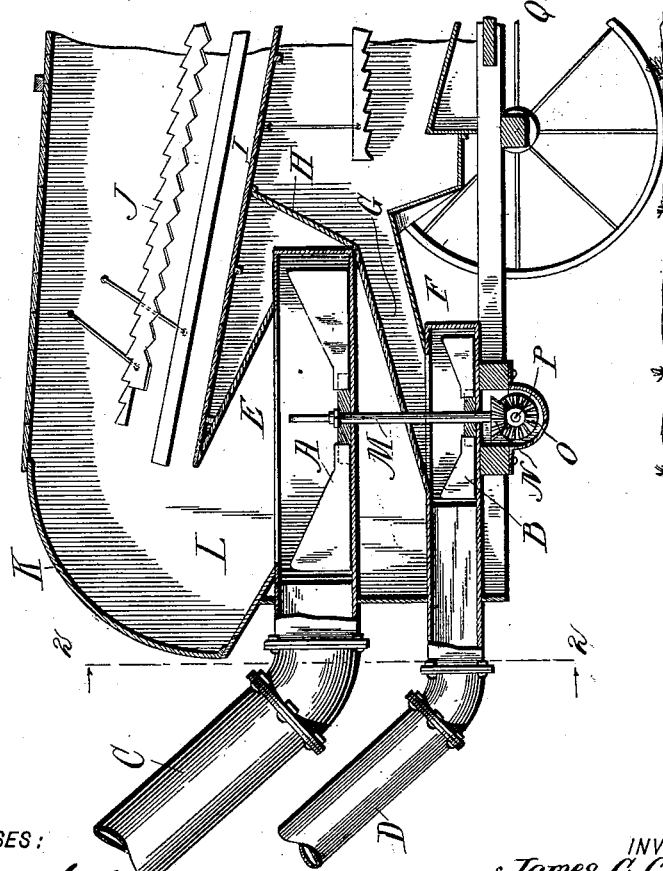
WITNESSES:
INVENTORS
James C. Carothers.
Nathan E. Morris, Jr.
BY
ATTORNEYS

UNITED STATES PATENT OFFICE.

JAMES C. CAROTHERS AND NATHAN E. MORRIS, JR., OF FRANKLIN, TENNESSEE.

STRAW-STACKER AND CHAFF-SEPARATOR.

SPECIFICATION forming part of Letters Patent No. 689,793, dated December 24, 1901.

Application filed June 5, 1901. Serial No. 63,258. (No model.)

*To all whom it may concern:*

Be it known that we, JAMES C. CAROTHERS and NATHAN E. MORRIS, Jr., citizens of the United States, residing in Franklin, in the county of Williamson and State of Tennessee, have invented a new and Improved Straw-Stacker and Chaff-Separator, of which the following is a specification.

Our invention is a pneumatic attachment for a threshing-machine, the same being adapted to separate chaff from the straw and deposit them in separate stacks or piles.

The invention is embodied in the construction, arrangement, and combination of parts hereinafter described, and illustrated in the appended drawings, in which—

Figure 1 is a vertical longitudinal section of the rear portion of a threshing-machine provided with our improved attachment. Fig. 2 is a vertical transverse section on the line 2 2 of Fig. 1.

Our invention is shown applied to a well-known form of threshing-machine provided with a grain-winnowing attachment of the usual construction and arrangement.

In Fig. 1, A indicates the fan of the straw-stacker, B the fan of the chaff-stacker, and C and D the independent straw and chaff chutes, respectively. The chutes are connected with the housings or drums E and F of the respective fans A and B and are in practice adapted to be raised and lowered and shifted laterally, as in the case of straw-chutes with which many forms of straw-stackers are provided. There being nothing new in the construction and arrangement of the chutes, detailed description is unnecessary. The chaff is delivered to the fan B by means of the flattened tube or chute G. The upper side of said chute is formed by a transverse partition H, which extends upward and is attached to the grain-board I, arranged in the usual way beneath the reciprocating straw-racks J. The end of the threshing-machine is closed by the hood K, by which chute L is formed for conveying straw to the fan A. It will be observed that the fan A may be larger than the chaff-fan B and that the latter may be arranged under the former or in any other convenient relative position, the only requisite being that the chaff passage or tube G may be connected conveniently therewith. Both fans are preferably driven by same shaft M, although separate means may be provided for this purpose. The said shaft M is shown in a vertical, and the fans in a horizontal, position; but it is obviously practicable to arrange them at an angle, and we do not restrict ourselves in this regard. The said shaft M is provided with a beveled gear N, which meshes with a similar gear O, keyed upon a transverse or horizontal shaft P. (See Fig. 2.) The said shaft P is provided with a belt-pulley Q and serves as the driving-shaft. A side belt (not shown) is arranged in practice to run on the said pulley Q. Thus both fans may be driven together and at the same speed and deliver straw and chaff to the respective chutes C and B, by which they are deposited in separate stacks.

While the fans A and B are shown connected to same shaft and driven at same speed, it is obviously practicable to arrange them disconnected and drive them at different speeds, and we do not restrict ourselves in this regard.

What we claim is—

1. The combination with a threshing-machine of the straw-drum and passage leading thereto, a chaff-drum and passage leading thereto, fans located in the respective drums, and the latter being arranged one under the other, and independent straw and chaff chutes connected with the respective drums, as shown and described, whereby straw and chaff are separated from each other within the threshing-machine and may be deposited in different piles, substantially as set forth.

2. An improved straw-stacking and chaff separating and stacking attachment for a threshing-machine, comprising a housing connected with the compartment containing straw-racks, a fan arranged in said housing, and a chute connected with the latter; a second housing, a fan located therein, an induction-chute leading from the winnower, a chaff-delivering chute connected with the housing, and a driving-shaft connected with fans, whereby they may be operated, substantially as shown and described.

3. An attachment for a threshing-machine, comprising two housings or drums, one below the other, two fans arranged in the respective drums, and a vertical shaft upon which both the fans are mounted, means for driving the said shaft, two delivery-chutes connected with the respective drums and having adaptation for horizontal movement, and a stationary transverse partition, extending from the grain-board of the straw-drum to the drum of the chaff-separator, whereby chaff is prevented from passing to the straw-fan and is delivered to the chaff-fan, substantially as shown and described.

JAMES C. CAROTHERS.
NATHAN E. MORRIS, JR.

Witnesses:
JNO. R. ROBERTS,
JNO. L. NEELY.